Patented Nov. 1, 1949

2,486,441

UNITED STATES PATENT OFFICE 2,486,441

CONDENSATION OF OLEFINS WITH ORGANIC COMPOUNDS

Francis M. Seger, Pitman, and Alexander N. Sachanen, Woodbury, N. J., assignors to Socony-Vacuum Oil Company, Incorporated, a corporation of New York No Drawing. Application May 23, 1947, Serial No. 750,170

7 Claims. (Cl. 260—683.15)

This invention relates to the condensation of mono-olefinic hydrocarbons, and is more particularly concerned with the provision of a new process for effecting the interaction of mono-olefinic hydrocarbons containing at least three carbon atoms per molecule with compounds of the group consisting of organic mono-oxides and organic sulfides. This invention also comprehends the reaction products produced by the above condensations and the lubrication of relatively moving surfaces by the use of certain of these reaction products, either alone or in admixture with other lubricants or improving agents.

It is well known in the art to effect a union between molecules of unsaturated hydrocarbons to produce compounds, called polymers, the molecular weights of which are multiples of the molecular weights of the original hydrocarbons. The operation is called polymerization and the conditions of temperature, pressure, etc., are called polymerizing conditions.

As is well known to those familiar with the art, polymerization reactions of the type referred to hereinbefore, may be conducted at relatively high temperatures and pressures, or may be carried out at lower temperatures and pressures, in the presence of substances or of mixtures of substances, that promote the polymerization reaction. These substances are referred to as polymerization catalysts.

Several substances have been proposed as polymerization catalysts, and among the most widely used are phosphoric acid, sulfuric acid, hydrogen fluoride, aluminum chloride, boron trifluoride and solid alumina-silica absorbents. In polymerization processes involving the use of these substances as catalysts, the olefinic hydrocarbons are polymerized into polymeric olefinic hydrocarbons, the molecular weight of which, depending upon the conditions of polymerization, may vary within very broad limits from dimers to polymers containing many thousands of carbon atoms. These products may be used as fuels, lubricants, plastics, etc., depending upon their molecular weights, and other characteristics.

It is also well known to those familiar with the art, that ethylene and conjugated diolefinic hydrocarbons, such as butadiene, are readily polymerized in the presence of peroxides or oxygen. This has been embodied in numerous processes which are of considerable commercial importance in the production of high molecular weight plastics and elastomers. In contrast to the polymers formed by the polymerization of ethylene or of conjugated diolefinic hydrocarbons in the presence of acidic polymerization catalysts, the products obtained when peroxides or oxygen are utilized as polymerization catalysts are predominantly high molecular weight polymers.

On the contrary, mono-olefinic hydrocarbons, other than ethylene, are not susceptible to peroxides or oxygen. Accordingly, it is well known that peroxides or oxygen do not promote the polymerization of mono-olefinic hydrocarbons containing at least three carbon atoms.

In accordance with United States patent application Serial No. 673,892, filed June 1, 1946, by Seger and Sachanen, it has recently been found that mono-olefinic hydrocarbons containing at least three carbon atoms can be condensed with organic peroxides. In accordance with this patent application it is disclosed that by using relatively large amounts of organic peroxides, mono-olefinic hydrocarbons or their polymers actually react with the organic peroxides to produce compounds containing structural elements of the organic peroxides.

It has now been discovered that generally similar reactions can be caused to occur between mono-olefinic hydrocarbons containing at least three carbon atoms and chemical compounds of the class consisting of organic mono-oxides and organic sulfides.

Accordingly, it is an object of the present invention to provide a process for effecting the condensation of mono-olefinic hydrocarbons containing at least three carbon atoms with chemical compounds of the class consisting of organic mono-oxides and organic sulfides. A very important object is to afford a process for the production of synthetic lubricating oil. Another important object is to provide a method of lubricating relatively moving surfaces by maintaining between them a film of the products formed by the aforesaid process, either alone or in admixture with other lubricants or improving agents. Still other objects and advantages of the present invention will become apparent to those skilled in the art from the following description.

Broadly stated the present invention provides a process for effecting the condensation of mono-olefinic hydrocarbons having at least three carbon atoms per molecule, with chemical compounds of the class consisting of organic monoxides and organic sulfides, which comprises reacting the mono-olefinic hydrocarbon reactants with the organic compounds, under conditions of reaction to be described in detail hereinafter.

In general, any organic mono-oxide or any organic sulfide, or any mixture thereof is suitable for the present purpose. The organic oxides and sulfides utilizable in the process of the present invention may be aliphatic, aromatic, heterocyclic or alicyclic. Ethylene oxide, ethylene sulfide, propylene oxide, propylene sulfide, butylene oxide and butylene sulfide may be mentioned by way of non-limiting examples of organic oxides and sulfides suitable for the process of this invention. In general, it is preferred to use the lower molecular weight aliphatic oxides and sulfides, that is, those containing not less than two nor more than six carbon atoms per molecule and containing but a single oxygen or sulfur atom per molecule. The oxides or sulfides may be derived from any suitable source as is well understood in the art, and advantageously in some instances, may be formed in situ.

In general, and in accordance with our invention, the amounts of organic monosulfides or organic sulfides, to be used are relatively large. In contrast to polymerization reaction of the prior art, which involve conjugated diolefinic hydrocarbons or ethylene, and wherein organic peroxides have been used and have functioned exclusively as catalysts, it has been found that in the present process, decomposition products of the organic oxides or sulfides, or the organic oxides or sulfides themselves, combine with the polymers formed by the polymerization of the mono-olefinic hydrocarbon reactants which the organic oxides or sulfides may or may not initially promote. Accordingly, the yields and the nature of the products obtained in the process of the present invention depend upon the amounts of and reflect the type of organic oxide or sulfide employed. For instance, when a mono-olefinic hydrocarbon containing at least three carbon atoms per molecule is reacted with an aromatic oxide or sulfide, in accordance with our process, polymers containing aromatic radicals and other structural fragments of the aromatic oxides or sulfides will be formed. Viewed in this light, our process is one involving both polymerization and the broader and more comprehensive reaction-condensation.

Good results may be obtained using proportions as low as one mol of organic oxide or sulfide to ten mols of a given mono-olefinic hydrocarbon reactant. In such cases, however, much of the mono-olefinic hydrocarbon reactant is usually recovered unreacted. On the other hand, excessive proportions of organic oxides or sulfides result in waste of these relatively expensive materials without achieving corresponding gains in the desired product. Therefore in this process, it appears expedient to employ organic mono-oxides or organic sulfides in amounts varying between about 0.1 mol and about 0.4 mol per mol of mono-olefinic hydrocarbon reactant. Usually it is found expedient to keep the proportions within a range of about 0.2 to 0.3 mol of the oxide or sulfide to 1 mol of the mono-olefinic hydrocarbon.

The reaction process of this invention is rather simply accomplished by merely mixing the reactants in a shaker bomb type of reactor, replacing the air therein by an inert atmosphere of nitrogen or the like, and applying the desired pressure and temperature for a sufficient length of time to complete the reaction.

Preferred conditions of reaction are 500–700° F. under autogenous pressures which usually are in the neighborhood of 300 to 600 pounds per square inch, although they may be either higher or lower. Reaction times will vary depending upon the particular reactants being used but are generally between 1 and 10 hours. Temperatures below 500° F. may be used, but at lower temperatures the yield of reaction product is generally lower, and the viscosity index of the products is generally not as satisfactory.

In accordance with the process of the present invention and depending upon the conditions of operation and the nature of the mono-olefinic hydrocarbon reactants, various condensation products, from comparatively low-boiling to high-boiling fractions, can be synthesized. Thus in our process, it is possible to produce fractions boiling within the range of those of lubricating oils, i. e., above 700° F. These products are of particular interest and importance. For example, synthetic lubricating oils obtained in accordance with our process have high viscosity indices, of the order of 100 or more, and the pour points may be low. In contrast to synthetic lubrication oils obtained in the processes of the prior art involving solely the polymerization of olefinic hydrocarbons, those of the present invention contain not only paraffinic chains but also other structural elements, depending upon the organic monoxide or organic sulfide used, for example, aromatic rings, which may affect the properties, particularly the stability, of the synthetic lubricating oils produced. Further, the synthetic lubricating oils synthesized by the alkylation of aromatics with olefinic hydrocarbons or chlorinated alkanes will differ materially from those of our invention due to the very nature of the reactions involved. Thus, as is well known, the processes involving alkylation reactions utilize strong catalysts which induce a series of side reactions, such as cracking, isomerization, etc. On the other hand, in our process, the reaction is effected under conditions whereby side reactions, if any, are kept to a minimum, and the temperature conditions are comparatively mild. Accordingly, the utilization of our process for the manufacture of synthetic lubricating oils must be considered a preferred, but nevertheless non-limiting, embodiment of our invention.

In general, any mono-olefinic hydrocarbon having at least three carbon atoms, or any two or more mono-olefinic hydrocarbons having at least three carbon atoms, may be used as the mono-olefinic hydrocarbon reactant of our process. In this connection, it must be clearly understood that when we speak of a mono-olefinic hydrocarbon reactant herein, we have reference to a normal or branched chain mono-olefinic hydrocarbon having at least three carbon atoms per molecule, as well as a mixture of two or more mono-olefinic hydrocarbons each having at least three carbon atoms per molecule. Butenes, propene, pentenes, decenes, cetenes, tridecenes, octadecenes, and dodecenes may be mentioned by way of non-limiting examples of mono-olefinic hydrocarbons suitable for our process. We prefer to use normal mono-olefinic hydrocarbons having at least three carbon atoms as the mono-olefinic hydrocarbon reactants, and especially the normal alpha-mono-olefinic hydrocarbons, i. e., those normal mono-olefinic hydrocarbons having a double bond adjacent the terminal carbon atoms, such as butene-1. The mono-olefinic hydrocarbon reactants utilized in our process may be derived from any suitable source, as is well known in the art and they may be used either in the pure state or in admixture with other constituents not undesirable. A conventional and preferred source of the mono-olefinic hydrocarbon reactants employed in the preferred embodiment of our invention, that of manufacturing synthetic lubricating oils, is a gasoline such as is obtained in cracking operations, or by the Fischer-Tropsch process, as is well understood in the art.

Generally speaking, when our process is operated to produce synthetic lubricating oils, normal alpha-mono-olefinic hydrocarbons containing between about seven and about twelve carbon atoms per molecule are preferred. From the standpoint of obtaining a product having optimum lubricating properties, we have found that normal alpha-mono-olefinic hydrocarbons containing about ten carbon atoms per molecule are to be preferred as reactants.

In general, in accordance with this invention, temperatures are used varying between about 500° F. and 700° F., depending upon the type of organic oxide or sulfide employed. The pressure to be employed depends upon the temperature used, and ordinarily a pressure sufficient to maintain the reactants in substantially the liquid phase at the temperatures employed, is adequate. The time of reaction depends, of course, upon the temperature, the nature of the reactants employed, and to a certain extent, upon the pressure. In general the higher the temperature employed, the shorter the reaction time required, the criterion used being the time required at a given reaction temperature to effect condensation, and more specifically to assure substantially complete consumption of the organic oxide or sulfide.

The process may be carried out as a batch, continuous or semi-continuous type of operation. Particularly when the process is carried out on a commercial scale, economic considerations make it preferable to operate in a continuous manner. For efficient operation, whether the process is carried out on a batch or continuous basis, it is essential that the mono-olefinic hydrocarbon reactant be intimately contacted with the organic mono-oxide or organic sulfide.

At the present time, the reaction mechanism involved in the process of the present invention is not fully understood. It seems probable that the reactions involve the free radical mechanism but beyond that it does not appear to be safe, even to generalize.

The following detailed examples are for the purpose of illustrating modes of carrying out the process of this invention. It is to be understood, however, that the invention is not to be considered as limited to the specific mono-olefinic hydrocarbon reactants or to the specific organic mono-oxides or sulfides, or the conditions of operation set forth therein. As will be apparent to those skilled in the art, a wide variety of other mono-olefinic hydrocarbon reactants and other organic mono-oxides and sulfides may be used.

EXAMPLE I

A typical reaction was accomplished as follows: A shaker bomb was chilled and charged with decene-1 to the extent of 280 grams (2.0 mols) and with liquid ethylene oxide, to the extent of 22 grams (0.5 mol). The air therein was replaced with nitrogen and the bomb heated at 500° F. for ten hours. The maximum pressure developed was 450 pounds per square inch which declined slowly during the run to about 325 pounds per square inch. Upon cooling there was a residual pressure of about 200 pounds per square inch indicating that some gaseous reaction products had been formed. The liquid product was poured from the bomb and weighed 280 grams. This product was vacuum-distilled and 191 grams of distillate with a specific gravity of 0.7487 and a bromine addition number of 106.6 was recovered. This was decene-1 suitable for recycling. The remainder of the product had the characteristics of a good synthetic oil and the yield of this oil was 83 grams. The characteristics of this and several other reaction products prepared by similar methods are shown in Table I below.

TABLE I

*Olefin oxide—Olefin reactions*

| Olefin oxide | Propylene Oxide | Ethylene Oxide | Ethylene Oxide | Ethylene Oxide | Ethylene Oxide |
|---|---|---|---|---|---|
| grams | 29 | 22 | 22 | 22 | 176 |
| mols | 0.5 | 0.5 | 0.5 | 0.5 | 4.0 |
| Olefin | Decene-1 | Decene-1 | Decene-1 | Decene-1 | Decene-1 |
| grams | 280 | 280 | 280 | 280 | 140 |
| mols | 2.0 | 2.0 | 2.0 | 2.0 | 1.0 |
| Atmosphere | N₂ | N₂ | N₂ | Air | N₂ |
| Temperature, °F | 400 | 500 | 500 | 600 | 600 |
| Time, hours | 10 | 10 | 10 | 10 | 10 |
| Max. pressure, lbs./sq. in | 350 | 450 | 575 | 800 | 2,600 |
| Vac. distillate: | | | | | |
| grams | 275 | 191 | 191 | 113 | 89 |
| gravity | 0.7471 | 0.7487 | 0.7459 | 0.7527 | ¹0.8203 |
| Bromine add'n | 110.0 | 106.6 | 106.1 | 95.0 | ¹29.5 |
| Residue: | | | | | |
| grams | 10 | 83 | 54 | 148 | 95 |
| Vis. S. U. at 210° F | 41.63 | 53.70 | 52.53 | 42.25 | 53.59 |
| V. I. | 118.5 | 128.5 | 132.3 | 144 | 100.5 |
| Pour, °F | 30.7 | −25 | −10 | −10 | +5 |
| Bromine, add'n | 1.4600 | 11.6 | 12.3 | 16.7 | 14.6 |
| Refractive index | | 1.4666 | 1.4678 | too dark | too dark |
| Specific gravity | | 0.8488 | 0.8478 | 0.8383 | 0.9007 |
| N. N. (neutralization number) | | 0.2 | | | |

¹ Upper layer of distillate; lower layer 0.8324 and 3.9, respectively.

TABLE I (Continued)

Olefin oxide—Olefin reactions

| Olefin oxide | Ethylene Oxide | Propylene Oxide | Propylene Oxide | Styrene Oxide | Ethylene Oxide | Propylene Oxide |
|---|---|---|---|---|---|---|
| grams | 160 | 29 | 232 | 60 | 22 | 29. |
| mols | 3.64 | 0.5 | 4.0 | 0.5 | 0.5 | 0.5. |
| Olefin | | Decene-1 | Decene-1 | Decene-1 | Decene-1 | Decene-1. |
| grams | | 280 | 140 | 280 | 280 | 280. |
| mols | | 2.0 | 1.0 | 2.0 | 2.0 | 2.0. |
| Atmosphere | N₂ | Air | N₂ | Air | Air | Air. |
| Temperature, °F | 610 | 615 | 600 | 600 | (¹) | 680. |
| Time, hours | 10½ | 5 | 10 | 10¼ | 10 | 5. |
| Max. pressure, lbs./sq. in. | 1,550 | 1,000 | 3,800 | >200 | 2,150 | 500. |
| Vac. distillate: | | | | | | |
| grams | 50 | 138 | 98 | 206 | 71 | 37 ². |
| gravity | 0.9881 | 0.7575 | 0.8871 | | | 0.7674. |
| Bromine add'n | 5.4 | 97.8 | 21.1 | | | 78.6 |
| Residue: | | | | | | |
| grams | 48 | 116 | 107 | 48 | 192 | 133. |
| Vis. S. U. at 210 °F. | 271.0 | 42.28 | 46.30 | 107.3 | 35.90 | 37.70. |
| V. I. | 80.9 | 139.7 | 82.4 | 16.2 | 112 | 141. |
| Pour, °F | | −10 | Zero | | −10 | −5. |
| Bromine add'n | too dark | 16.1 | 16.9 | 30.5 | 15.7 | 20.9. |
| Refractive index | too dark | 1.4632 | too dark | | 1.4730 | 1.4610. |
| Specific gr. | 1.1528 | 0.8408 | 0.8927 | >1.0760 | 0.8529 | 0.8383. |
| N. N. (neutralization number) | | | | | | 1.6. |

¹ Recorded as 600° F., believed much higher (thermocouple defective).
² An appreciable amount of atmospheric distillate was discarded unweighed.

A similar series of example runs were performed using olefin sulfides instead of olefin mono-oxides. These resulted in products, the data for which is given in Table II below.

TABLE II

Olefin sulfide—Olefin reactions

| Olefin sulfide | Propylene sulfide | Propylene sulfide | Propylene sulfide. |
|---|---|---|---|
| grams | 37 | 148 | 222. |
| mols | 0.5 | 2.0 | 3.0. |
| Olefin | Decene-1 | Decene-1 | |
| grams | 280 | 70 | |
| mols | 2.0 | 0.5 | |
| Atmosphere | N₂ | N₂ | N₂. |
| Temperature, °F | 600 | 610 | 600. |
| Time, hours | 10 | 10½ | 10. |
| Max. pressure, lbs./sq. in. | 500 | 2,100 | 3,100. |
| Vac. distillate, grams | 210 | 48 | (¹). |
| Residue: | | | |
| grams | 94 | 42 | (¹). |
| Vis. S. U. at 210° F | 36.76 | 91.06 | |
| V. I. | 100.5 | 14.1 | |
| Pour, °F | −30 | | |
| Bromine add'n | 54.1 | 87.1 | |
| Refractive index | too dark | | |
| Specific gr | 0.8718 | | |
| N. N. (Neutralization Number) | 0.6 | | |
| Sulfur, percent | 5.53 | 21.4 | |

¹ Coke-like solid residue chipped from bomb.

It will be apparent that the present invention provides an efficient and commercially feasible process for effecting the condensation of mono-olefinic hydrocarbons containing at least three carbon atoms with compounds of the class consisting of organic mono-oxides and organic sulfides, or more specifically, with compounds consisting of olefinic mono-oxides and olefinic mono-sulfides. This process is of considerable value in the manufacture of synthetic lubricating oils, as well as in the manufacture of organic reaction products important as intermediates in organic synthesis.

From the characteristics of the products produced by the reaction process as described above, it will be apparent that many of the products will be highly useful in reducing friction if placed between relatively moving parts, either alone or in combination with other materials. The products of this invention have been found to be readily blendable with other lubricating compositions.

The present invention may be embodied in other specific forms without departing from the spirit or essential attributes thereof, and it is therefore desired that the present embodiments be considered in all respects as illustrative and not restrictive, reference being had to the appended claims rather than the foregoing description to indicate the scope of the invention.

We claim:

1. The process for effecting the condensation of a mono-olefinic hydrocarbon having at least three carbon atoms per molecule with an organic material of the class consisting of an olefinic mono-oxide, an olefinic mono-sulfide, and mixtures thereof, which comprises: contacting said hydrocarbon with only an organic material of said class in amounts of at least about 0.1 mol per mol of said hydrocarbon, at temperatures varying from about 500° F. to about 700° F. and for a period of time sufficient to effect condensation.

2. The process for effecting the condensation of a mono-olefinic hydrocarbon having at least three carbon atoms per molecule with an olefinic mono-oxide, which comprises: contacting said hydrocarbon with only said oxide in amounts of at least about 0.1 mol per mol of said hydrocarbon, at temperatures varying from about 500° F. to about 700° F. and for a period of time sufficient to effect condensation.

3. The process for effecting the condensation of a mono-olefinic hydrocarbon having at least three carbon atoms per molecule with an olefinic mono-sulfide, which comprises: contacting said hydrocarbon with only said sulfide in amounts of at least about 0.1 mol per mol of said hydrocarbon, at temperatures varying from about 500° F. to about 700° F. and for a period of time sufficient to effect condensation.

4. The process for effecting the condensation of a normal alpha-mono-olefinic hydrocarbon containing between about seven and about twelve carbon atoms per molecule with an organic material of the class consisting of an olefinic mono-oxide, an olefinic mono-sulfide, and mixtures thereof, which comprises: contacting said hydrocarbon with only an organic material of said class in amounts of at least about 0.1 mol per mol of said hydrocarbon, at temperatures varying from about 500° F. to about 700° F. and for a period of time sufficient to effect condensation.

5. The process for effecting the condensation of decene-1 with ethylene oxide, which comprises: contacting decene-1 with only ethylene oxide, in a molar ratio of 4 to 1, at about 600° F. for about 10 hours.

6. The process for effecting the condensation of decene-1 with propylene oxide, which comprises: contacting decene-1 with only propylene oxide, in a molar ratio of 4 to 1, at about 615° F. for about 5 hours.

7. The process for effecting the condensation of decene-1 with propylene oxide, which comprises: contacting decene-1 with only propylene oxide, in a molar ratio of 4 to 1, at about 680° F. for about 5 hours.

FRANCIS M. SEGER.
ALEXANDER N. SACHANEN.

REFERENCES CITED

The following references are of record in the file of this patent:

UNITED STATES PATENTS

| Number | Name | Date |
| --- | --- | --- |
| 1,981,819 | Wiezevich et al. | Nov. 20, 1934 |
| 2,300,069 | Skooglund | Oct. 27, 1942 |
| 2,380,072 | Reid | July 10, 1945 |
| 2,381,907 | Hughes et al. | Aug. 14, 1945 |
| 2,398,926 | Dorough | Apr. 23, 1946 |
| 2,401,922 | Frey et al. | June 11, 1946 |